US012047766B2

(12) United States Patent
Laaksonen et al.

(10) Patent No.: US 12,047,766 B2
(45) Date of Patent: Jul. 23, 2024

(54) AUDIO/VIDEO CAPTURING USING AUDIO FROM REMOTE DEVICE

(71) Applicant: Nokia Technologies Oy, Espoo (FI)

(72) Inventors: Lasse Juhani Laaksonen, Tampere (FI); Miikka Tapani Vilermo, Siuro (FI); Arto Juhani Lehtiniemi, Lempaala (FI); Jussi Artturi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 134 days.

(21) Appl. No.: 17/796,078

(22) PCT Filed: Jan. 21, 2021

(86) PCT No.: PCT/EP2021/051309
§ 371 (c)(1),
(2) Date: Jul. 28, 2022

(87) PCT Pub. No.: WO2021/151771
PCT Pub. Date: Aug. 5, 2021

(65) Prior Publication Data

US 2023/0073568 A1 Mar. 9, 2023

(30) Foreign Application Priority Data

Jan. 31, 2020 (EP) .................................... 20154873

(51) Int. Cl.
*H04S 7/00* (2006.01)
*H04R 1/10* (2006.01)
*H04R 5/027* (2006.01)
*H04R 5/033* (2006.01)

(52) U.S. Cl.
CPC ........... *H04S 7/304* (2013.01); *H04R 1/1041* (2013.01); *H04R 5/027* (2013.01); *H04R 5/033* (2013.01); *H04R 2420/07* (2013.01); *H04S 2400/11* (2013.01); *H04S 2400/15* (2013.01)

(58) Field of Classification Search
CPC .. H04S 7/304; H04S 2400/11; H04S 2400/15; H04R 1/1041; H04R 5/027; H04R 5/033; H04R 2420/07
USPC ....... 381/303, 56, 58, 77, 74, 380, 374, 150, 381/123, 122; 455/78, 569.1, 74, 90.3; 257/777, 734; 700/74; 73/597
See application file for complete search history.

(56) References Cited

U.S. PATENT DOCUMENTS

2013/0226593 A1 8/2013 Magnusson et al. ......... 704/276
2016/0021477 A1 1/2016 Hiipakka et al.
2018/0350405 A1 12/2018 Marco et al.
2019/0089456 A1 3/2019 Kasilya Sudarsan et al.
2021/0185277 A1 * 6/2021 McDevitt ............. G11B 27/031

* cited by examiner

*Primary Examiner* — Vivian C Chin
*Assistant Examiner* — Con P Tran
(74) *Attorney, Agent, or Firm* — Harrington & Smith

(57) ABSTRACT

An apparatus, method and computer program product for: receiving spatial audio information captured by a plurality of microphones, receiving a captured audio object from an audio device wirelessly connected to the apparatus, determining an audio audibility value relating to the audio device, determining whether the audio audibility value fulfils at least one criterion, and activating, in response to determining that the audio audibility value fulfils the at least one criterion, inclusion of the audio object captured by the audio device in the spatial audio information captured by the plurality of microphones.

12 Claims, 5 Drawing Sheets

AUDIO/VIDEO CAPTURING USING AUDIO FROM REMOTE DEVICE

CROSS REFERENCE TO RELATED APPLICATION

This patent application is a U.S. National Stage application of International Patent Application Number PCT/EP2021/051309 filed Jan. 21, 2021, which is hereby incorporated by reference in its entirety, and claims priority to EP 20154873.2 filed Jan. 31, 2020.

TECHNICAL FIELD

The present application relates generally to spatial audio information. More specifically, the present application relates to adding an audio object to spatial audio information.

BACKGROUND

The amount of multimedia content increases continuously. Users create and consume multimedia content, and it has a big role in modern society.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: receiving spatial audio information captured by a plurality of microphones, receiving a captured audio object from an audio device wirelessly connected to the apparatus, determining an audio audibility value relating to the audio device, determining whether the audio audibility value fulfils at least one criterion, and activating, in response to determining that the audio audibility value fulfils the at least one criterion, inclusion of the audio object captured by the audio device in the spatial audio information captured by the plurality of microphones.

According to a second aspect of the invention, there is provided a method comprising receiving spatial audio information captured by a plurality of microphones, receiving a captured audio object from an audio device wirelessly connected to the apparatus, determining an audio audibility value relating to the audio device, determining whether the audio audibility value fulfils at least one criterion, and activating, in response to determining that the audio audibility value fulfils the at least one criterion, inclusion of the audio object captured by the audio device in the spatial audio information captured by the plurality of microphones.

According to a third aspect of the invention, there is provided a computer program comprising instructions for causing an apparatus to perform at least the following: receiving spatial audio information captured by a plurality of microphones, receiving a captured audio object from an audio device wirelessly connected to the apparatus, determining an audio audibility value relating to the audio device, determining whether the audio audibility value fulfils at least one criterion, and activating, in response to determining that the audio audibility value fulfils the at least one criterion, inclusion of the audio object captured by the audio device in the spatial audio information captured by the plurality of microphones.

According to a fourth aspect of the invention, there is provided an apparatus comprising at least one processor and at least one memory including computer program code, the at least one memory and the computer program code configured to with the at least one processor, cause the apparatus at least to: receive spatial audio information captured by a plurality of microphones, receive a captured audio object from an audio device wirelessly connected to the apparatus, determine an audio audibility value relating to the audio device, determine whether the audio audibility value fulfils at least one criterion, and activate, in response to determining that the audio audibility value fulfils the at least one criterion, inclusion of the audio object captured by the audio device in the spatial audio information captured by the plurality of microphones.

According to a fifth aspect of the invention, there is provided a non-transitory computer readable medium comprising program instructions for causing an apparatus to perform at least the following: receiving spatial audio information captured by a plurality of microphones, receiving a captured audio object from an audio device wirelessly connected to the apparatus, determining an audio audibility value relating to the audio device, determining whether the audio audibility value fulfils at least one criterion, and activating, in response to determining that the audio audibility value fulfils the at least one criterion, inclusion of the audio object captured by the audio device in the spatial audio information captured by the plurality of microphones.

According to a sixth aspect of the invention, there is provided a computer readable medium comprising program instructions for causing an apparatus to perform at least the following: receiving spatial audio information captured by a plurality of microphones, receiving a captured audio object from an audio device wirelessly connected to the apparatus, determining an audio audibility value relating to the audio device, determining whether the audio audibility value fulfils at least one criterion, and activating, in response to determining that the audio audibility value fulfils the at least one criterion, inclusion of the audio object captured by the audio device in the spatial audio information captured by the plurality of microphones.

BRIEF DESCRIPTION OF THE DRAWINGS

Some example embodiments will now be described with reference to the accompanying drawings.

DETAILED DESCRIPTION

Figure 1:
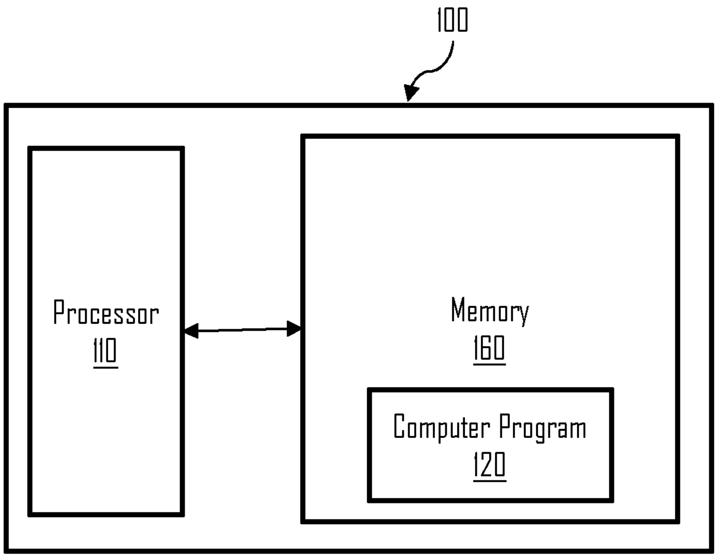
FIG. 1 shows a block diagram of an example apparatus in which examples of the disclosed embodiments may be applied.

The following embodiments are exemplifying. Although the specification may refer to "an", "one", or "some"

embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to an apparatus configured to activate inclusion of audio signals captured by an audio device in audio information received by the apparatus. Audio signals captured by an audio device may comprise, for example, audio captured by a single or a plurality of microphones.

Some example embodiments relate to an apparatus configured to receive spatial audio information captured by a plurality of microphones, receive a captured audio object from an audio device wirelessly connected to the apparatus, determine an audio audibility value relating to the audio device, determine whether the audio audibility value fulfils at least one criterion, and activate, in response to determining that the audio audibility value fulfils the at least one criterion, inclusion of the audio object captured by the audio device in the spatial audio information captured by the plurality of microphones.

Some example embodiments relate to activating a distributed audio or audio-visual capture. The distributed audio/audio-visual capture comprises utilizing an audio object received from a separate device.

Some example embodiments relate to an apparatus comprising an audio codec. An audio codec is a codec that is configured to encode and/or decode audio signals. An audio codec may comprise, for example, a speech codec that is configured to encode and/or decode speech signals. In practice, an audio codec comprises a computer program implementing an algorithm that compresses and decompresses digital audio data. For transmission purposes, the aim of the algorithm is to represent high-fidelity audio signal with minimum number of bits while retaining quality. In that way, storage space and bandwidth required for transmission of an audio file may be reduced.

Different audio codecs may have different bit rates. A bit rate refers to the number of bits that are processed or transmitted over a unit of time. Typically, a bit rate is expressed as a number of bits or kilobits per second (e.g., kbps or kbits/second). A bit rate may comprise a constant bit rate (CBR) or a variable bit rate (VBR). CBR files allocate a constant amount of data for a time segment while VBR files allow allocating a higher bit rate, that is more storage space, to be allocated to the more complex segments of media files and allocating a lower bit rate, that is less storage space, to be allocated to less complex segments of media files. A VBR operation may comprise discontinuous transmission (DTX) that may be used in combination with CBR or VBR operation. In DTX operation, parameters may be updated selectively to describe, for example, a background noise level and/or spectral noise characteristics during inactive periods such as silence, whereas regular encoding may be used during active periods such as speech.

There are different kinds of audio/speech codecs, for example, an enhanced voice services (EVS) codec suitable for improved telephony and teleconferencing, audio-visual conferencing services and streaming audio. Another example codec is an immersive voice and audio services (IVAS) codec. An aim of the IVAS codec is to provide support for real-time conversational spatial voice, multi-stream teleconferencing, virtual reality (VR) conversational communications and/or user generated live and on-demand content streaming. Conversational communication may comprise, for example, real-time two-way audio between a plurality of users. An IVAS codec provides support for, for example, from mono to stereo to fully immersive audio encoding, decoding and/or rendering. An immersive service may comprise, for example, immersive voice and audio for virtual reality (VR) or augmented reality (AR), and a codec may be configured to handle encoding, decoding and rendering of speech, music and generic audio. A codec may also support channel-based audio, object-based audio and/or scene-based audio.

Channel-based audio may, for example, comprise creating a soundtrack by recording a separate audio track (channel) for each loudspeaker or panning and mixing selected audio tracks between at least two loudspeaker channels. Common loudspeaker arrangements for channel-based surround sound systems are 5.1 and 7.1, which utilize five and seven surround channels, respectively, and one low-frequency channel. A drawback of channel-based audio is that each soundtrack is created for a specific loudspeaker configuration such as 2.0 (stereo), 5.1 and 7.1.

Object-based audio addresses this drawback by representing an audio field as a plurality of separate audio objects, each audio object comprising one or more audio signals and associated metadata. An audio object may be associated with metadata that defines a location or trajectory of that object in the audio field. Object-based audio rendering comprises rendering audio objects into loudspeaker signals to reproduce the audio field. As well as specifying the location and/or movement of an object, the metadata may also define the type of object, for example, acoustic characteristics of an object, and/or the class of renderer that is to be used to render the object. For example, an object may be identified as being a diffuse object or a point source object. Object-based renderers may use the positional metadata with a rendering algorithm specific to the particular object type to direct sound objects based on knowledge of loudspeaker positions of a loudspeaker configuration.

Scene-based audio combines the advantages of object-based and channel-based audio and it is suitable for enabling truly immersive VR audio experience. Scene-based audio comprises encoding and representing three-dimensional (3D) sound fields for a fixed point in space. Scene-based audio may comprise, for example, ambisonics and parametric immersive audio. Ambisonics comprises a full-sphere surround sound format that in addition to a horizontal plane comprises sound sources above and below a listener. Ambisonics may comprise, for example, first-order ambisonics (FOA) comprising four channels or higher-order ambisonics (HOA) comprising more than four channels such as 9, 16, 25, 36, or 49 channels. Parametric immersive audio may comprise, for example, metadata-assisted spatial audio (MASA).

Spatial audio may comprise a full sphere surround-sound to mimic the way people perceive audio in real life. Spatial audio may comprise audio that appears from a user's position to be assigned to a certain direction and/or distance. Therefore, the perceived audio may change with the movement of the user or with the user turning. Spatial audio may comprise audio created by sound sources, ambient audio or a combination thereof. Ambient audio may comprise audio that might not be identifiable in terms of a sound source such as traffic humming, wind or waves, for example. The full sphere surround-sound may comprise a spatial audio field and the position of the user or the position of the capturing device may be considered as a reference point in the spatial audio field. According to an example embodiment, a reference point comprises the centre of the audio field.

A device comprising a plurality of microphones may be used for capturing spatial audio information. For example, a user may capture spatial audio or video information comprising spatial audio when watching a performance of a choir. However, a position of the user capturing the spatial audio information might not be optimal in terms of the position being far away from the choir. If the distance between the capturing device and the sound source is long, the signal-to-noise ratio (SNR) is more deteriorated than a shorter distance between the capturing device and the sound source. Another problem is that it might not be possible to isolate, for example, the performance of a particular person in the choir from the overall capture. Isolating a particular sound source from a plurality of sound sources may be very challenging, especially if there are a plurality of spatially overlapping sound sources.

FIG. 1 is a block diagram depicting an apparatus 100 operating in accordance with an example embodiment of the invention. The apparatus 100 may be, for example, an electronic device such as a chip or a chipset. The apparatus 100 comprises one or more control circuitry, such as at least one processor 110 and at least one memory 160, including one or more algorithms such as computer program code 120 wherein the at least one memory 160 and the computer program code are 120 configured, with the at least one processor 110 to cause the apparatus 100 to carry out any of example functionalities described below.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus 100.

The at least one memory 160 stores computer program code 120 which when loaded into the processor 110 control the operation of the apparatus 100 as explained below. In other examples, the apparatus 100 may comprise more than one memory 160 or different kinds of storage devices.

Computer program code 120 for enabling implementations of example embodiments of the invention or a part of such computer program code may be loaded onto the apparatus 100 by the manufacturer of the apparatus 100, by a user of the apparatus 100, or by the apparatus 100 itself based on a download program, or the code can be pushed to the apparatus 100 by an external device. The computer program code 120 may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
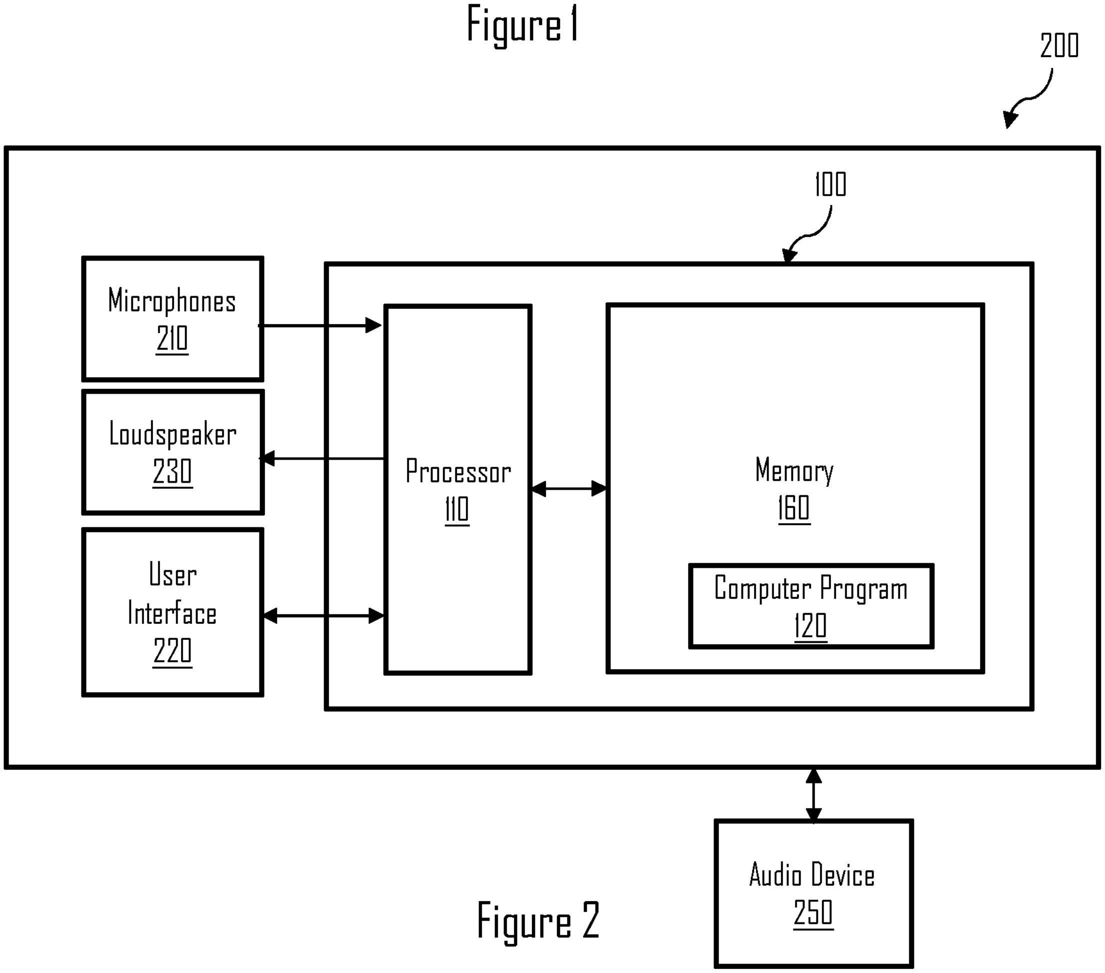
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a household appliance, a CD-, DVD or Blu-ray player, or a media player. In the examples below it is assumed that the apparatus 200 is a mobile computing device or a part of it.

In the example embodiment of FIG. 2, the apparatus 200 is illustrated as comprising the apparatus 100, a plurality of microphones 210, one or more loudspeakers 230 and a user interface 220 for interacting with the apparatus 200 (e.g. a mobile computing device). The apparatus 200 may also comprise a display configured to act as a user interface 220. For example, the display may be a touch screen display. In an example embodiment, the display and/or the user interface 220 may be external to the apparatus 200, but in communication with it.

Additionally or alternatively, the user interface 220 may also comprise a manually operable control such as a button, a key, a touch pad, a joystick, a stylus, a pen, a roller, a rocker, a keypad, a keyboard or any suitable input mechanism for inputting and/or accessing information. Further examples include a camera, a speech recognition system, eye movement recognition system, acceleration-, tilt- and/or movement-based input systems. Therefore, the apparatus 200 may also comprise different kinds of sensors such as one or more gyro sensors, accelerometers, magnetometers, position sensors and/or tilt sensors.

According to an example embodiment, the apparatus 200 is configured to establish radio communication with another device using, for example, a Bluetooth, WiFi, radio frequency identification (RFID), or a near field communication (NFC) connection. For example, the apparatus 200 may be configured to establish radio communication with a wireless headphone, augmented/virtual reality device or the like.

According to an example embodiment, the apparatus 200 is operatively connected to an audio device 250. According to an example embodiment, the apparatus 200 is wirelessly connected to the audio device 250. For example, the apparatus 200 may be connected to the audio device 250 over a Bluetooth connection or the like.

The audio device 250 may comprise at least one microphone for capturing audio signals and at least one loudspeaker for playing back received audio signals. The audio device 250 may further be configured to filter out background noise and/or detect in-ear placement. The audio device 250 may comprise a single audio device 250 or a first audio device and a second audio device configured to function as a pair. An audio device 250 comprising a first audio device and a second audio device may be configured such that the first audio device and the second audio device may be used separately and/or independently of each other.

According to an example embodiment, the audio device 250 comprises a wireless headphone. The wireless headphone may be used independently of other wireless headphones and/or together with at least one other wireless headphone. For example, assuming the audio device 250 comprises a pair of wireless headphones, same or different audio information may be directed to each of the wireless headphones, or audio information may be directed to a single wireless headphone and the other wireless headphone may act as a microphone.

According to an example embodiment, the audio device 250 is configured to receive audio information from the apparatus 200. The apparatus 200 may be configured to control provision of audio information to the audio device 250 based on characteristics of the audio device 250 or characteristics of the apparatus 200. For example, the apparatus 200 may be configured to adjust one or more settings in the apparatus 200 and/or the audio device 250 when providing audio information to the audio device 250. The one or more settings may relate to, for example, playback of the audio information, the number of loudspeakers available, or the like.

The audio information may comprise, for example, speech signals representative of speech of a caller or streamed audio information. According to an example embodiment, the audio device 250 is configured to render audio information received from the apparatus 200 by causing output of the received audio information via at least one loudspeaker.

According to an example embodiment, the audio device 250 is configured to transmit audio information to the apparatus 200. The audio information may comprise, for example, speech signals representative of speech or some other type of audio information.

According to an example embodiment, the apparatus 200 is configured to receive spatial audio information captured by a plurality of microphones. The spatial audio information comprises at least one audio signal and at least one audio parameter for controlling the at least one audio signal. The at least one audio parameter may comprise, for example, an audio parameter corresponding to a direction and/or position of audio with respect to a reference point in a spatial audio field.

According to an example embodiment, the apparatus 200 is configured to capture spatial audio information using the plurality of microphones 210. The plurality of microphones 210 may be configured to capture audio signals around the capturing device. The plurality of microphones 210 may be comprised by the apparatus 200 or the plurality of microphones 210 may comprise separate microphones operatively connected to the apparatus 200.

According to an example embodiment, the spatial audio information comprises spatial audio information captured during a voice or video call.

According to an example embodiment, the apparatus 200 is configured to receive a captured audio object from an audio device wirelessly connected to the apparatus 200. The captured audio object may comprise, for example, an audio object captured by the at least one microphone comprised by the audio device 250.

According to an example embodiment, the audio object comprises audio data associated with metadata. Metadata associated with an audio object provides information on the audio data. Information on the audio data may comprise, for example, one or more properties of the audio data, one or more characteristics of the audio data and/or identification information relating to the audio data. For example, metadata may provide information on a position associated with the audio data in a spatial audio field, movement of the audio object in the spatial audio field and/or a function of the audio data.

According to an example embodiment, the audio object comprises a spatial audio object comprising one or more audio signals and associated metadata that defines a location and/or trajectory of the second audio object in a spatial audio field.

Without limiting the scope of the claims, an advantage of an audio object is that metadata may be associated with audio signals such that the audio signals may be reproduced by defining their position in a spatial audio field.

Receiving an audio object from the audio device may comprise decoding, using an audio codec, the received audio object. The audio codec may comprise, for example, an IVAS codec or a suitable Bluetooth audio codec.

According to an example embodiment, the apparatus 200 comprises an audio codec comprising a decoder for decompressing received data such as an audio stream and/or an encoder for compressing data for transmission. Received audio data may comprise, for example, an encoded bitstream comprising binary bits of information that may be transferred from one device to another.

According to an example embodiment, the audio object comprises an audio stream. An audio stream may comprise a live audio stream comprising real-time audio. An audio stream may be streamed together with other types of media streaming or audio may be streamed as a part of other types of media streaming such as video streaming. An audio stream may comprise, for example, audio from a live performance or the like.

According to an example embodiment, the apparatus 200 is configured to determine an audio audibility value relating to the audio device 250.

The audio audibility value may comprise a parameter value comprising information on a relation between the audio device 250 and the apparatus 200. For example, the parameter value may comprise contextual information such as the position of the audio device 250 in relation to the position of the apparatus 200. As another example, the parameter value may comprise information on characteristics of content captured by the audio device 250 in relation to characteristics of the content captured by the apparatus 200.

According to an example embodiment, the audio audibility value relating to the audio device 250 depends upon a distance between the audio device 250 and the apparatus 200. According to an example embodiment, the apparatus 200 is configured to update the audio audibility value in response to receiving information on a changed distance between the audio device 250 and the apparatus 200. The apparatus 200 may receive information on a changed distance, for example, by detecting a change in the distance or in response to receiving information on a changed distance from a cloud server to which the apparatus 200 and the audio device 250 are operatively connected.

According to an example embodiment, the audio audibility value relating to the audio device 250 comprises the distance between the audio device 250 and the apparatus 200. The distance may comprise an absolute distance or a relative distance.

The apparatus 200 may be configured to determine a distance between the apparatus 200 and the audio device 250 based on position information such as global positioning system (GPS) coordinates, based on a wireless connection between the apparatus 200 and the audio device 250, based on an acoustic measurement such as a delay in detecting an event, or the like.

As another example, the apparatus 200 may be configured to determine a distance between the apparatus 200 and the audio device 250 based on information received from a cloud server. For example, if the location of the apparatus 200 and the audio device 250 is stored on a cloud server, the cloud server may inform the apparatus 200 about the respective locations or a distance between the apparatus 200 and the audio device 250.

According to an example embodiment, the audio audibility value relating to the audio device 250 comprises a time of flight of sound between the audio device 250 and the apparatus 200.

According to an example embodiment, the audio audibility value relating to the audio device 250 is adapted based on a sound pressure or noise level. The sound pressure comprises an overall sound pressure and the noise level comprises an overall noise level. According to another example embodiment, the audio audibility value relating to the audio device 250 is adapted based on a correlation measure between the spatial audio information and the audio object.

According to an example embodiment, the apparatus 200 is configured to determine whether the audio audibility value fulfils at least one criterion. According to an example embodiment, determining whether the audio audibility value fulfils at least one criterion comprises comparing the audio audibility value with a corresponding threshold value and determining whether the audio audibility value is equal to, below or above the threshold value.

According to an example embodiment, the at least one criterion comprises a threshold value dependent upon the distance between the audio device 250 and the apparatus 200. For example, assuming the audio audibility value comprises a distance between the apparatus 200 and the audio device 250, the threshold value comprises a threshold distance. As another example, assuming the audio audibility value comprises a time of flight of sound, the threshold value comprises a threshold time.

According to an example embodiment, the threshold value dependent upon the distance between the audio device 250 and the apparatus 200 is adapted based on a sound pressure or noise level. For example, a sound source that is relatively far away in a quiet environment may remain audible in a spatial audio capture using the apparatus 200, whereas the sound source in a noisier environment needs to be closer to the apparatus 200 to be audible.

Without limiting the scope of the claims, an advantage of adapting the threshold value based on sound pressure level or noise level is that the threshold value may be dynamically adapted taking the circumstances into account.

According to an example embodiment, determining whether the audio audibility value fulfils at least one criterion comprises determining whether the audio audibility value is above a threshold value.

According to another example embodiment, determining whether the audio audibility value fulfils at least one criterion comprises determining whether the audio audibility value is below a threshold value.

According to a further example embodiment, determining whether the audio audibility value fulfils at least one criterion comprises determining whether the audio audibility value is equal to a threshold value.

According to an example embodiment, the apparatus 200 is configured to activate, in response to determining that the audio audibility value fulfils the at least one criterion, inclusion of the audio object captured by the audio device 250 in the spatial audio information captured by the plurality of microphones.

Activating inclusion of the audio object captured by the audio device 250 in the spatial audio information captured by the plurality of microphones may comprise activating a microphone associated with the audio device 250, activating reception of audio signals from the audio device 250, deactivating a loudspeaker associated with the audio device 250, or the like.

Activating inclusion of the audio object in the spatial audio information may comprise controlling an operation of the audio device 250. According to an example embodiment, the apparatus 200 is configured to switch the audio device 250 from a first mode to a second mode. The first mode may comprise, for example, a loudspeaker mode and the second mode may comprise, for example, a microphone mode. A loudspeaker mode comprises using the audio device 250 as a loudspeaker and a microphone mode comprises using the audio device 250 as a microphone.

According to an example embodiment, switching the audio device 250 from a first mode to a second mode comprises switching an audio output port of the audio device 250 into an audio input port of the audio device 250.

According to an example embodiment, the apparatus 200 is configured to provide modified spatial audio information in response to activating inclusion of the audio object in the spatial audio information. The modified spatial audio information may comprise a combined representation of an audio scene comprising the spatial audio information and the audio object, or a representation of an audio scene in which the spatial audio information and the audio object are separate components. For example, modified spatial information may comprise the spatial audio information into which the audio object is downmixed. As another example, the modified spatial audio information may comprise the spatial audio information and the audio object as separate components.

Inclusion of the audio object in the spatial audio information may comprise controlling an audio encoder input by the apparatus 200. For example, inclusion of the audio object in the spatial audio information may comprise including the audio object in an audio codec input format such that the same audio encoder is configured to encode the two audio signals jointly or packetize and deliver them together.

According to an example embodiment, the apparatus 200 is configured to include the audio object in an audio encoder input. According to another example embodiment, the apparatus 200 is configured to activate use of an audio object in an audio encoder input. According to a further example embodiment, the apparatus 200 is configured to renegotiate or reinitialize an audio encoder input such that the audio object is included in the encoder input. For example, if the audio encoder input was previously negotiated as first-order ambisonics (FOA), the audio encoder input may be renegotiated as FOA and the audio object. According to a yet further example embodiment, the apparatus 200 is configured to replace previous spatial audio information with modified spatial audio information.

Inclusion of the audio object in the spatial audio information may be performed based on metadata associated with the audio object.

Inclusion of the audio object in the spatial audio information may be activated for a period of time. In other words, the inclusion may also be terminated. According to an example embodiment, the apparatus 200 is configured to deactivate inclusion of the audio object captured by the audio device in the spatial audio information captured by the plurality of microphones.

According to an example embodiment, the apparatus 200 is configured to deactivate inclusion of the audio object captured by the audio device in the spatial audio information in response to determining the audio audibility value fulfils at least one criterion. The at least one criterion for deactivating the inclusion of the audio object may be different from the at least one criterion for activating the inclusion of the audio object.

Without limiting the scope of the claims, an advantage of different threshold values for activating and deactivating the inclusion of the audio object in the spatial audio information is that suitable hysteresis may be provided in order to prevent frequently activating and deactivating the inclusion of the audio object in the spatial audio information.

According to an example embodiment, deactivating inclusion of the audio object captured by the audio device 250 in the spatial audio information may comprise deactivating a microphone associated with the audio device 250, deactivating reception of audio signals from the audio device 250, activating a loudspeaker associated with the audio device 250, instructing a microphone associated with the audio device to act as a loudspeaker or a combination thereof.

Deactivating inclusion of the audio object in the spatial audio information may comprise controlling an operation of the audio device 250. According to an example embodiment, the apparatus 200 is configured to switch the audio device 250 from a second mode to a first mode. The first mode may comprise, for example, a loudspeaker mode and the second mode may comprise, for example, a microphone mode. A loudspeaker mode comprises using the audio device 250 as a loudspeaker and a microphone mode comprises using the audio device 250 as a microphone.

As mentioned above, the apparatus 200 may comprise a user interface for enabling a user to control and/or monitor the received spatial audio information and/or the received audio object. For example, the user interface may enable controlling and/or monitoring volume, locations of audio objects in a spatial audio field, balance or the like.

According to an example embodiment, the apparatus 200 is configured to provide a user interface based on available spatial audio objects. Therefore, the apparatus 200 may be configured to dynamically adapt the user interface.

According to an example embodiment, the apparatus 200 is configured to provide a control element for controlling the captured spatial audio information and, in response to determining that the audio audibility value fulfils the at least one criterion, adapt the user interface. Adapting the user interface may comprise, for example, modifying the contents of the user interface by adding, removing and/or modifying one or more user interface elements. Modifying the one or more user interface elements may comprise, for example, modifying the appearance and/or the operation of the one or more user interface elements. For example, the user interface may comprise a volume control for the captured spatial audio information and, in response to determining that the audio audibility value fulfils the at least one criterion, the user interface may be adapted to further comprise a volume control for the audio object.

According to an example embodiment, the apparatus 200 comprises means for performing the features of the claimed invention, wherein the means for performing comprises at least one processor 110, at least one memory 160 including computer program code 120, the at least one memory 160 and the computer program code 120 configured to, with the at least one processor 110, cause the performance of the apparatus 200. The means for performing the features of the claimed invention may comprise means for receiving spatial audio information captured by a plurality of microphones, means for receiving a captured audio object from an audio device wirelessly connected to the apparatus, means for determining an audio audibility value relating to the audio device, means for determining whether the audio audibility value fulfils at least one criterion, and means for activating, in response to determining that the audio audibility value fulfils the at least one criterion, inclusion of the audio object captured by the audio device in the spatial audio information captured by the plurality of microphones.

The apparatus 200 may further comprise means for deactivating inclusion of the audio object captured by the plurality of microphones. The apparatus 200 may further comprise means for switching the audio device 250 from a first mode to a second mode. The apparatus 200 may further comprise means for providing a control element for controlling the captured spatial audio information and means for, in response to determining that the audio audibility value fulfils the at least one criterion, adapting the user interface.

Figure 3A:
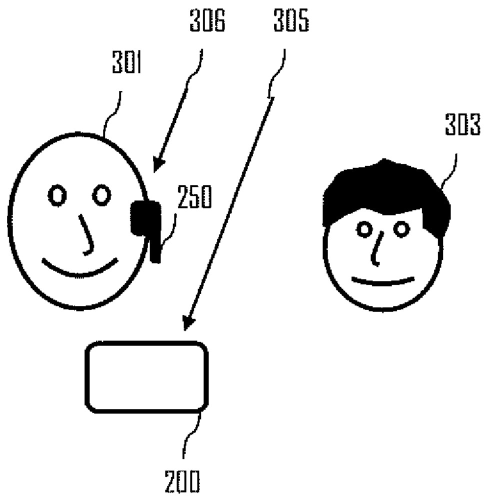
FIGS. 3A, 3B and 3C illustrate an example system in which examples of the disclosed embodiments may be applied.
Figure 3B:
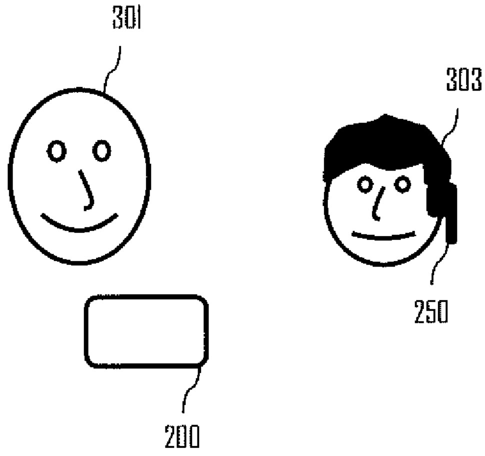
Figure 3C:
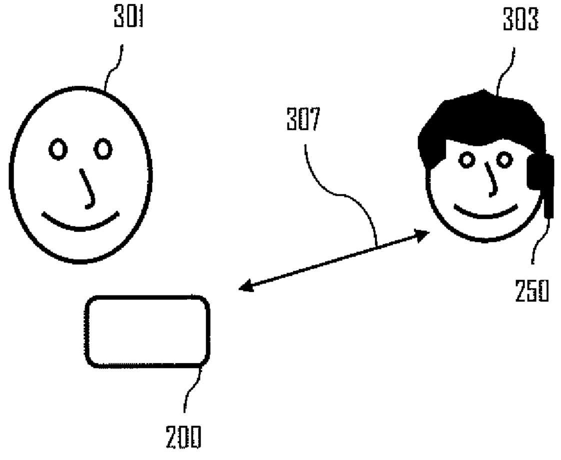

FIGS. 3A, 3B and 3C illustrate an example system according to an example embodiment. In the examples of FIGS. 3A, 3B and 3C, the apparatus 200 comprises an audio codec supporting user generated live content streaming.

In the example of FIG. 3A, a first user is in a voice or video call with a second user (not shown). For example, the first user 301 may use an apparatus 200 for capturing spatial audio information and receive audio from a second user using an audio device 250 such as a wireless headphone. The audio device 250 is wirelessly connected to the apparatus 200 using, for example, a Bluetooth connection. The audio device 250 comprises at least one loudspeaker and at least one microphone. In the example of FIG. 3A, audio received from the second user is illustrated with arrow 306. The first user 301 captures spatial audio information for the second user. Captured spatial audio information is illustrated with arrow 305. In the example of FIGS. 3A, 3B and 3C, a third user 303 is a sound source of interest. For example, the third user 303 may be a person singing in a choir.

In the example of FIG. 3A, the first user 301 uses a single wireless headphone. In such as case, the headphone may be configured to act as a microphone or a loudspeaker by default.

In the example of FIG. 3B, the first user 301 has given the audio device 250 to the third user 303. Assuming the third user 303 is a person singing in a choir, when the third user 303 moves to a venue, the distance between the audio device 250 and the apparatus 200 increases.

In the example of FIG. 3C, the distance 307 between the apparatus 200 and the audio device 250 increases. The apparatus 200 is configured to determine whether the distance 307 between the apparatus 200 and the audio device 250 is above a threshold value. The apparatus 200 is further configured to activate, in response to determining that the distance 307 between the apparatus 200 and the audio device 250 is above a threshold value, inclusion of an audio object captured by the audio device 250 in the spatial audio information captured by the apparatus 200. If the audio device 250 acts as a microphone by default, activating inclusion of an audio object may comprise activating reception of audio signals from the audio device 250. If the audio device 250 acts as a loudspeaker by default, activating inclusion of an audio object may comprise switching the audio device 250 from a loudspeaker mode to a microphone mode.

Figure 4A:
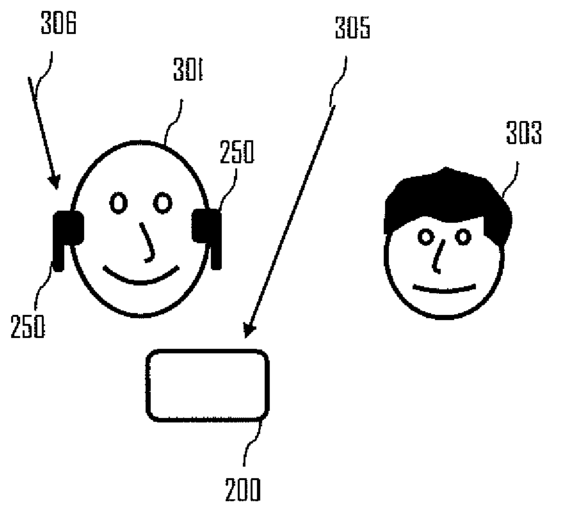
FIGS. 4A, 4B and 4C illustrate another example system in which examples of the disclosed embodiments may be applied.
Figure 4B:
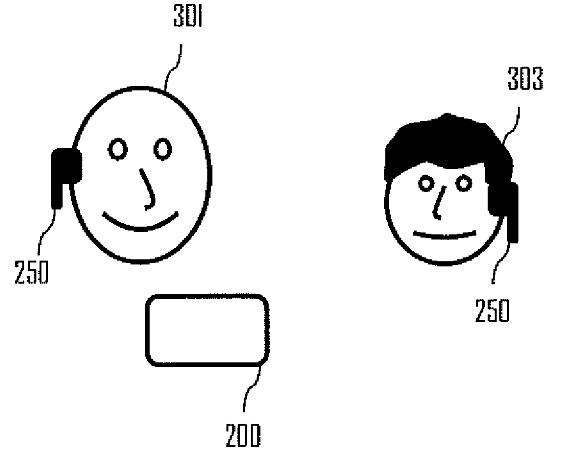
Figure 4C:
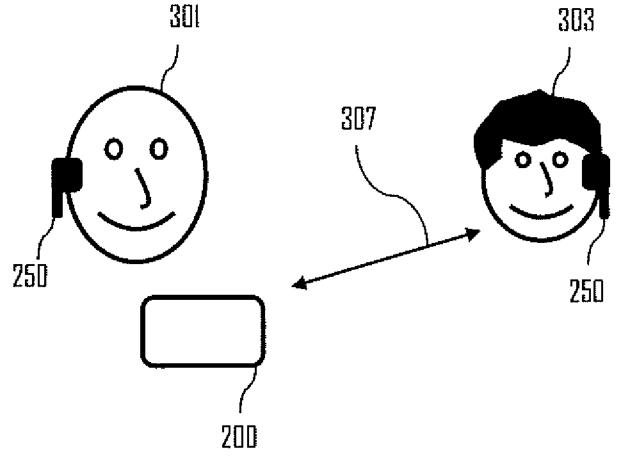

FIGS. 4A, 4B and 4C illustrate another example system according to an example embodiment. In the examples of FIGS. 4A, 4B and 4C, the apparatus 200 comprises an audio codec supporting user generated live content streaming.

In the example of FIG. 4A, a first user is in a voice or video call with a second user (not shown). For example, the first user 301 may use an apparatus 200 for capturing spatial audio information and receive audio from a second user using a pair of audio devices 250 such as a wireless headphone. The pair of audio devices 250 is wirelessly connected to the apparatus 200 using, for example, a Bluetooth connection.

The audio device 250 comprises at least one loudspeaker and at least one microphone. In the example of FIG. 4A, audio received from the second user is illustrated with arrow 306. The first user 301 captures spatial audio information for the second user. Captured spatial audio information is illustrated with arrow 305. In the example of FIGS. 4A, 4B and 4C, a third user 303 is a sound source of interest. For example, the third user 303 may be a person singing in a choir.

In the example of FIG. 4A, the first user 301 uses a pair of wireless headphones. The pair of wireless headphones may comprise a first wireless headphone and a second wireless headphone. In such as case, one headphone may be configured to act as a microphone and one headphone may be configured to act as a loudspeaker.

In the example of FIG. 4B, the first user 301 has given one of the audio devices 250 to the third user 303. In the following, it is assumed that the first user 301 uses the first wireless headphone and the third user 303 uses the second wireless headphone. Assuming the third user 303 is a person singing in a choir, when the third user 303 moves to a venue, the distance between the audio device 250 of the third user 303 and the apparatus 200 increases.

In the example of FIG. 4C, the distance 307 between the apparatus 200 and the audio device 250 (e.g. the second wireless headphone) increases. The apparatus 200 is configured to determine whether the distance 307 between the apparatus 200 and the audio device 250 of the third user 303 is above a threshold value. The apparatus 200 is further configured to activate, in response to determining that the distance 307 between the apparatus 200 and the audio device 250 of the third user 303 is above a threshold value, inclusion of an audio object captured by the audio device 250 in the spatial audio information captured by the apparatus 200. Assuming the audio device 250 of the third user 303 is configured to act as a microphone, activating inclusion of an audio object may comprise activating reception of audio signals from the audio device 250 of the third user. On the other hand, assuming the audio device 250 of the third user 303 is configured to act as a loudspeaker, activating inclusion of an audio object may comprise sending an instruction to change the audio device 250 of the third user 303 from a first mode to a second mode. For example, activating inclusion of an audio object may comprise sending an instruction to change the audio device 250 of the third user 303 from a loudspeaker mode to a microphone mode. As another example, activating inclusion of an audio object may comprise sending an instruction to stop using the loudspeaker which may cause activating a microphone mode.

Figure 5A:
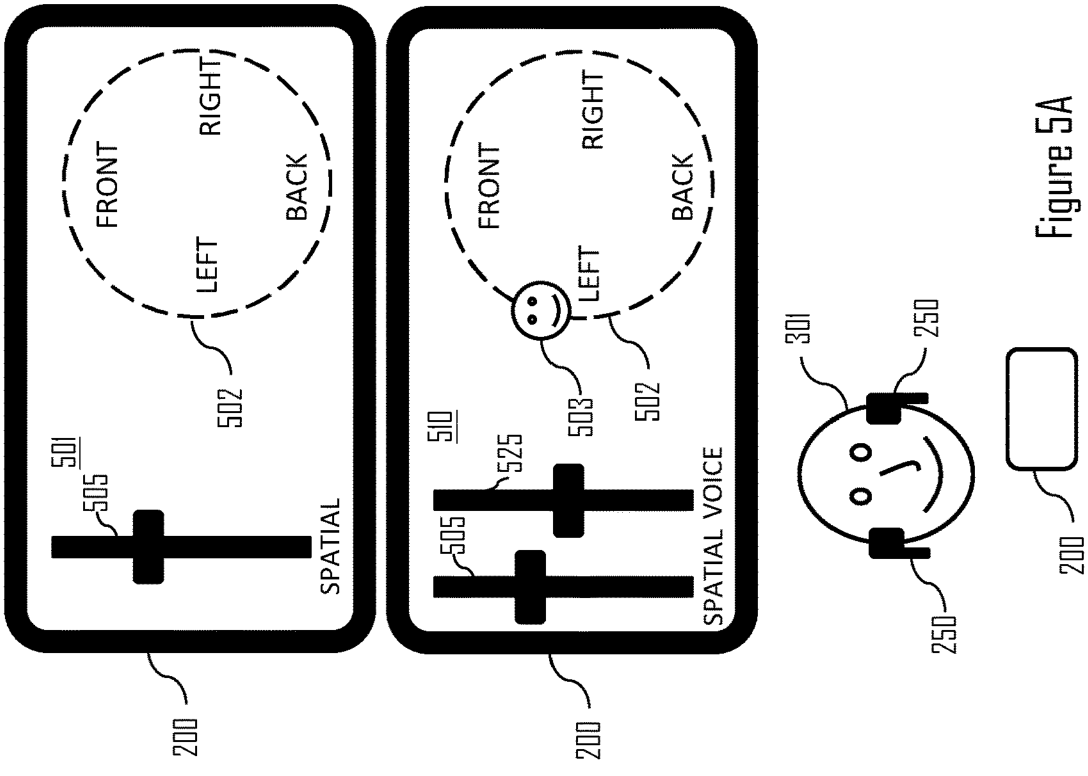
FIGS. 5A and 5B illustrate example user interfaces.

FIGS. 5A and SB illustrates example user interfaces according to an example embodiment. More specifically, example user interfaces in Figure SA illustrate user interfaces for controlling captured spatial audio information and example user interface in Figure SB illustrate dynamically adapting the user interfaces illustrated in Figure SA in response to determining that the audio audibility relating to an audio device 250 value fulfils at least one criterion for activating inclusion of an audio object in the spatial information.

In the example of Figures SA and SB, the audio device 250 comprises a pair of wireless headphones. The pair of wireless headphones may comprise a first wireless headphone and a second wireless headphone. Similarly to the examples of FIGS. 4A, 4B and 4C, it is assumed that the first user 301 uses the first wireless headphone and the third user 303 uses the second wireless headphone.

The apparatus 200 is configured to provide the user interfaces 501 and 510. The apparatus 200 is further configured to provide one or more control elements presented on the user interface 501, 510 and a representation of a spatial audio field 502. In the examples of Figure SA and SB, it is assumed that a reference point of the spatial audio field comprises the centre of the spatial audio field 502 and that the centre of the spatial audio field corresponds to the position of the apparatus 200.

In the example of Figure SA, the first user 301 utilizes a spatial audio input. The user interface 501 comprises a control element SOS for controlling the volume of the spatial audio information. The user interface 501 is further configured to present a representation of a spatial audio field 502. The representation of the spatial audio field 502 comprises indications of different directions such as front, right, back and left with respect to the reference point.

Figure 5B:
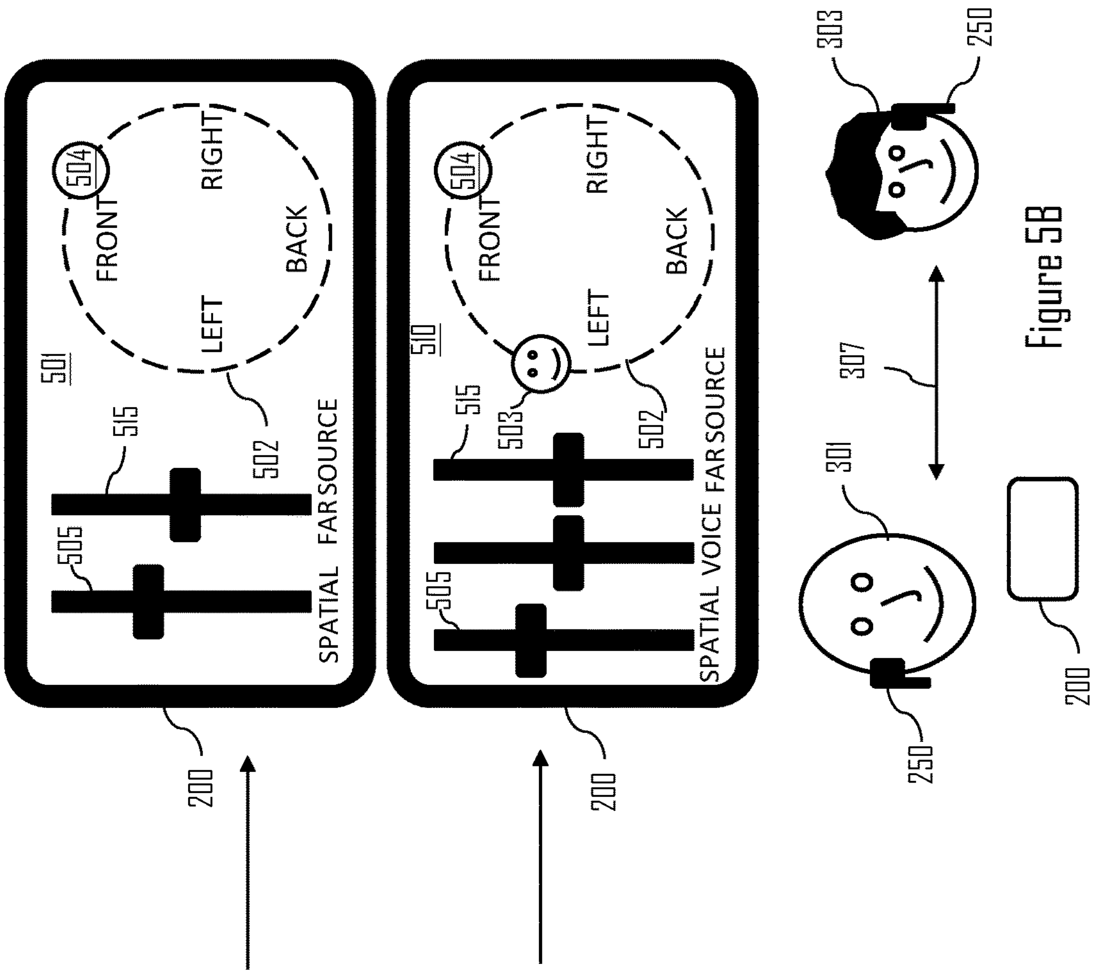

FIG. 5B illustrates an example where the first user 301 has given one wireless headphone, such as the second wireless headphone, to the third user 303 and the audio audibility value relating to an audio device 250 value fulfils at least one criterion for activating inclusion of an audio object in the spatial audio information.

In the example of FIG. 5B, the at least one criterion comprises a distance 307 between the wireless headphone 250 of the third user 303 (the second wireless headphone) and the wireless headphone 250 of the first user 301 (the first wireless headphone) or the apparatus 200. When the distance 307 is above a threshold value, inclusion of an audio object in the spatial audio information is activated by the apparatus 200. The apparatus 200 is configured to adapt the user interface 501 in order to enable controlling the audio object.

In the example of FIG. 5B, the user interface 501 comprises a control element 505 for controlling the volume of the received spatial audio information and a control element 515 for controlling the volume of the added audio object. The added audio object is indicated as a far source on the control element 515. The location of the audio object 504 is indicated as being approximately in a front-right direction in the spatial audio field 502.

Referring back to the example of FIG. 5A, the user interface 510 comprises a control element 505 for controlling the volume of the received spatial audio information and a control element 525 for controlling the volume of voice channel. For example, the first user 301 may capture spatial audio information and at the same time listen to audio from a second user or monitor the spatial audio capture. In other words, the first user 301 utilizes two audio inputs. The representation of the spatial audio field 502 comprises indications of different directions such as front, right, back and left with respect to the reference point and an indication that the position of the voice channel 503 is approximately towards left.

In the example of FIG. 5B, the user interface 501 comprises a control element 505 for controlling the volume of the received spatial audio information, a control element 525 for controlling the volume of voice channel and a control element 515 for controlling the volume of the added audio object. The added audio object is indicated as a far source on the user interface 515. The location of the audio object 504 is indicated as being approximately in a front-right direction and the position of the voice channel 503 is indicated as being approximately towards left in the spatial audio field.

Figure 6:
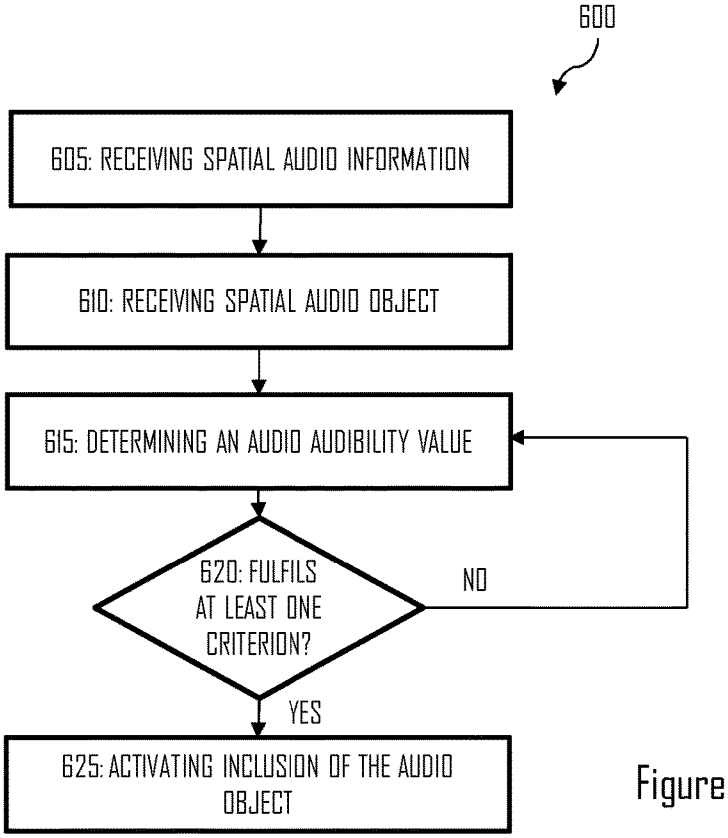
FIG. 6 illustrates an example method.

FIG. 6 illustrates an example method 600 incorporating aspects of the previously disclosed embodiments. More specifically the example method 600 illustrates activating inclusion of an audio object in spatial audio information. The method may be performed by the apparatus 200 such as a mobile computing device.

The method starts with receiving 605 spatial audio information captured by a plurality of microphones. The method continues with receiving 610 a captured audio object from an audio device 250 wirelessly connected to the apparatus 200.

The method further continues with determining 615 an audio audibility value relating to the audio device 250.

The method further continues with determining 620 whether the audio audibility value fulfils at least one criterion. If the audio audibility value does not fulfil the at least one criterion, the method returns to determining 620 whether the audio audibility value fulfils at least one criterion. If the audio audibility value fulfils the at least one criterion, the method continues with activating 625 inclusion of the audio object captured by the audio device 250 in the spatial audio information captured by the plurality of microphones.

Figure 7A:
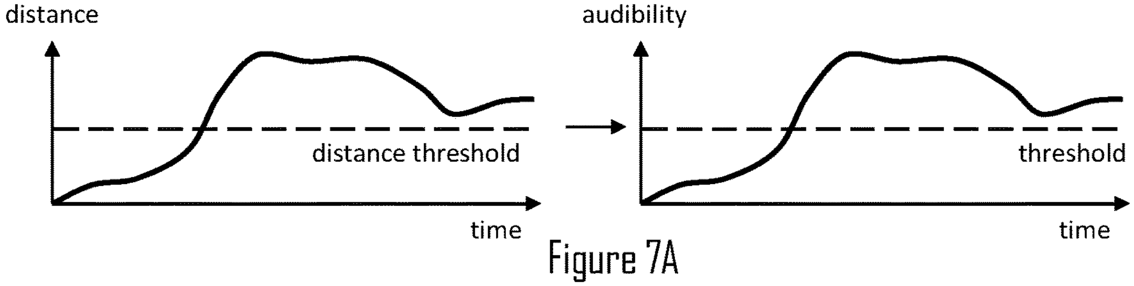
FIGS. 7A and 7B illustrate example audio audibility values and thresholds.
Figure 7B:
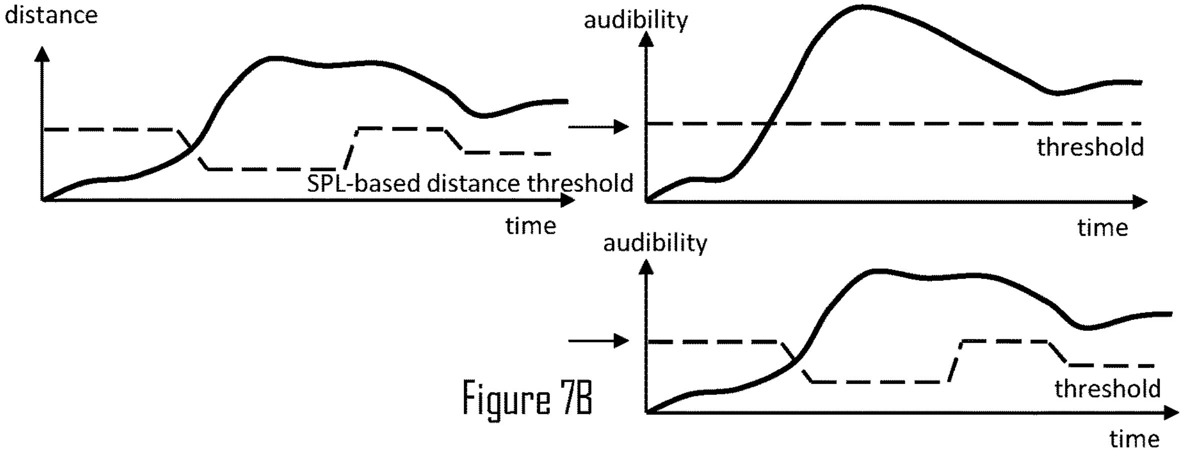

FIGS. 7A and 7B illustrate examples of audio audibility values and audio audibility threshold values. The apparatus 200 is configured to determine an audio audibility value based on a relationship between the apparatus 200 and the audio device 250.

In the example of FIG. 7A, the audio audibility value is determined based on the distance between the apparatus 200 and the audio device 250. According to an example embodiment, the distance between the apparatus 200 and the audio device 250 is used as the audio audibility value. In such a case, the distance may be compared to one or more threshold distance values.

FIG. 7B illustrates two example embodiments of audio audibility values and audio audibility threshold values. In the example of FIG. 7B, the audio audibility value is determined based on the distance between the apparatus 200 and the audio device 250 that is adapted based on a sound pressure level. Determining an audio audibility value based on a sound pressure level may comprise maintaining the sound pressure level as a fixed value and adapting the distance in dependence of the sound pressure value or determining an adaptive audio audibility threshold value that is dependent upon the sound pressure level.

Without limiting the scope of the claims, an advantage of activating inclusion of an audio object to spatial audio information is that it is possible to combine and/or isolate a sound source of interest in spatial audio information. Another advantage is that a user capturing spatial audio information can pick-up a sound source of interest even though a venue is crowded or the like. A further advantage is that a sound source that might not be audible due to distance or other factors can be included in the spatial audio information. A yet further advantage is that a sound source of interest may be included in the spatial audio information when necessary. A yet further advantage is that a regular accessory may be utilized without a need to invest in expensive and complex devices.

Without in any way limiting the scope, interpretation, or application of the claims appearing below, a technical effect of one or more of the example embodiments disclosed herein is that high quality spatial audio capture may be provided without complex arrangements. Another technical effect is that inclusion of an audio object may be activated automatically. A further technical effect is that computational resources and bandwidth may be saved when unnecessary inclusion of the sound source of interest in the spatial audio information is avoided.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:

at least one processor; and at least one memory including computer program code, the at least one memory and the computer program code configured to, with the at least one processor, cause the apparatus to perform:

receiving spatial audio information captured with a plurality of microphones;

receiving a captured audio object, wherein the captured audio object comprises one or more audio signals and associated metadata, from an audio device that is wirelessly connected to the apparatus, and wherein the captured audio object is captured with the audio device and the audio device comprises at least one loudspeaker and at least one microphone of the plurality of microphones;

determining an audio audibility value relating to the audio device, wherein the audio audibility value is determined based on a distance between the apparatus and the audio device and the distance is used as the audio audibility value, or the audio audibility value is a time of flight of sound between the audio device and the apparatus;

determining whether the audio audibility value fulfils at least one criterion with comparing the distance to one or more threshold distance values or with comparing the time of flight of sound to a threshold time; and activating, in response to determining that the audio audibility value fulfils the at least one criterion with determining that the distance is above at least one threshold distance value of the one or more threshold distance values or that the time of flight is above the threshold time, inclusion of the audio object captured with the audio device in the spatial audio information captured with the plurality of microphones.

2. The apparatus according claim 1, wherein the audio object comprises an audio stream.

3. The apparatus according to claim 1, wherein the audio audibility value relating to the audio device is adapted based on a sound pressure level or noise level.

4. The apparatus according to claim 1, wherein the audio device comprises a wireless headphone.

5. The apparatus according to claim 1, wherein the audio device comprises a first wireless headphone and a second wireless headphone configured to work as a pair of wireless headphones, and the audio audibility value comprises a distance between the first wireless headphone and the second wireless headphone.

6. The apparatus according to claim 1, wherein the at least one memory and the computer program code are configured to, with the at least one processor, cause the apparatus to perform deactivating inclusion of the audio object captured with the audio device in the spatial audio information captured with the plurality of microphones.

7. The apparatus according to claim 1, wherein the at least one memory and the computer program code are configured to, with the at least one processor, cause the apparatus to perform switching the audio device from a first mode to a second mode.

8. The apparatus according to claim 7, wherein the first mode comprises a loudspeaker mode that comprises using the audio device as a loudspeaker and the second mode comprises a microphone mode that comprises using the audio device as a microphone.

9. The apparatus according to claim 7, wherein the at least one memory and the computer program code are configured to, with the at least one processor, cause the apparatus to perform the switching of the audio device from the first mode to the second mode comprising switching an audio output port of the audio device into an audio input port of the audio device.

10. The apparatus according to claim 1, wherein the at least one memory and the computer program code are configured to, with the at least one processor, cause the apparatus to perform providing a control element for controlling the captured spatial audio information and, in response to determining that the audio audibility value fulfils the at least one criterion, adapting the user interface.

11. A method comprising:

receiving spatial audio information captured with a plurality of microphones;

receiving a captured audio object, wherein the captured audio object comprises one or more audio signals and associated metadata, from an audio device wirelessly connected to the apparatus, and wherein the captured audio object is captured with the audio device and the audio device comprises at least one loudspeaker and at least one microphone of the plurality of microphones;

determining an audio audibility value relating to the audio device, wherein the audio audibility value is determined based on a distance between the apparatus and the audio device and the distance is used as the audio audibility value, or the audio audibility value is a time of flight of sound between the audio device and the apparatus;

determining whether the audio audibility value fulfils at least one criterion with comparing the distance to one or more threshold distance values or with comparing the time of flight of sound to a threshold time; and activating, in response to determining that the audio audibility value fulfils the at least one criterion with determining that the distance is above at least one threshold distance value of the one or more threshold distance values or that the time of flight is above the threshold time, inclusion of the audio object captured with the audio device in the spatial audio information captured with the plurality of microphones.

12. A non-transitory computer readable medium comprising instructions for causing an apparatus to perform at least the following:

receiving spatial audio information captured with a plurality of microphones;

receiving a captured audio, wherein the captured audio object comprises one or more audio signals and associated metadata, object from an audio device that is wirelessly connected to the apparatus, and wherein the captured audio object is captured with the audio device and the audio device comprises at least one loudspeaker and at least one microphone of the plurality of microphones;

determining an audio audibility value relating to the audio device, wherein the audio audibility value is determined based on a distance between the apparatus and the audio device and the distance is used as the audio audibility value, or the audio audibility value is a time of flight of sound between the audio device and the apparatus;

determining whether the audio audibility value fulfils at least one criterion with comparing the distance to one or more threshold distance values or with comparing the time of flight of sound to a threshold time; and activating, in response to determining that the audio audibility value fulfils the at least one criterion with determining that the distance is above at least one threshold distance value or that the time of flight is above the threshold time, inclusion of the audio object captured with the audio device in the spatial audio information captured with the plurality of microphones.

* * * * *